United States Patent [19]

Ehrat

[11] Patent Number: 4,588,127
[45] Date of Patent: May 13, 1986

[54] MATERIAL-SPREADING FIELD VEHICLE HAVING MEANS FOR ON-SITE METERING AND MIXING OF SOIL-TREATING CHEMICALS

[76] Inventor: Arthur H. Ehrat, c/o Farmers Elevator Co., Lowder, Ill. 62662

[21] Appl. No.: 403,370

[22] Filed: Jul. 30, 1982

[51] Int. Cl.$^4$ .............................................. B05B 9/06
[52] U.S. Cl. .................................... 239/156; 239/61; 239/662
[58] Field of Search ................. 239/156, 155, 157, 66, 239/62, 172, 304, 662; 222/626, 627, 613, 615, 616, 618, 621

[56] References Cited

U.S. PATENT DOCUMENTS

| | | | |
|---|---|---|---|
| 3,081,909 | 3/1963 | Hooker | 222/134 X |
| 3,233,832 | 2/1966 | Hallberg | 239/156 |
| 3,344,993 | 10/1967 | Wilder et al. | 239/662 X |
| 3,401,890 | 9/1968 | Middlesworth | 239/662 X |
| 3,419,221 | 12/1968 | Fyrk | 239/656 |
| 3,865,308 | 2/1975 | Pringle | 239/61 |
| 3,980,230 | 9/1976 | Pringle et al. | 239/61 |

FOREIGN PATENT DOCUMENTS

| | | | |
|---|---|---|---|
| 422321 | 9/1911 | France | 239/662 |
| 420240 | 3/1967 | Switzerland | 239/662 |

Primary Examiner—James B. Marbert
Attorney, Agent, or Firm—Rogers, Howell, Moore & Haferkamp

[57] ABSTRACT

A material-spreading field vehicle has a large hopper for holding comminuted plant nutrients, a conveyor for feeding nutrients to an evenly spreading distributor, and a plurality of relatively small always-carried auxiliary containers for holding concentrated water-solutions and/or suspensions of herbicides, insecticides, hormones and other soil-treating chemicals. The apparatus includes vehicle-speed-responsive mechanism for insuring uniform mixture of the solid and liquid materials prior to spreading, by the use of positive-action pumps for each liquid feed line to insure accurate metering of each liquid to the conveyor which leads to a conventional mixer upstream from the distributor. Each pump is driven from the vehicle-speed-responsive mechanism by a variable-ratio speed-changer for metering the several materials being combined. A manually controllable device may be employed to vary the mixed-material-dispensing rate as desired.

3 Claims, 3 Drawing Figures

MATERIAL-SPREADING FIELD VEHICLE HAVING MEANS FOR ON-SITE METERING AND MIXING OF SOIL-TREATING CHEMICALS

RELATED APPLICATIONS

This application is a refiling of identically-entitled abandoned application Ser. No. 767,954, filed Feb. 11, 1977 and drawn to the solid-material-spreading species of the generic invention of which the liquid-spraying species is being patented in the applicant's presently allowed application Ser. No. 219,276, filed Dec. 22, 1980 and now U.S. Pat. No. 4,358,054, issued Nov. 9, 1982 and entitled "Field Sprayer Tank Vehicle Having Means for On-Site Metering and Mixing of Soil-Treating Chemicals" (which is a continuation of abandoned application Ser. No. 829,331, filed Aug. 31, 1977).

BACKGROUND AND OBJECTS OF THE INVENTION

This invention relates to a solid-material-spreader species of the generic invention which is also embodied in the liquid-spraying species disclosed in the applicant's copending application Ser. No. 685,972, filed May 13, 1976 and entitled "Field-Sprayer Tank-Vehicle Having Means for On-Site Metering and Mixing of Soil-Treating Chemicals."

Field material-distributing machines having vehicle-speed-responsive means for insuring uniform coverage are known (e.g. Hallberg U.S. Pat. No. 3,233,832). But no apparatus is known to have a plurality of relatively small auxiliary tanks for holding and mixing-in on-site, the concentrated chemical additives which heretofore have been pre-mixed with the basic material in the large container of the vehicle. Pre-mixing has the decided disadvantage of making it difficult to prevent waste of materials and/or time. If a field is larger than anticipated, a second trip by the driver will be required. If the field is smaller than expected, waste of valuable chemicals will result. In either case the driver may be tempted to detrimentallyunder-apply or over-apply the dwindling pre-mixed supply. A further disadvantage of conventional pre-mixing is the time-consuming necessity of thoroughly washing-out the large container to remove even traces of chemicals that would be objectionable on a subsequent job.

It is according the principal object of the present invention to provide a field material-spreader vehicle having a plurality of relatively small auxiliary containers for chemical additives for time- and material-saving on-site metered mixing thereof with a hopper-carried base material.

It is another object to provide such a vehicle having speed-variable positive-acting pumps for each line for accurate metering of the several concentrated ingredients, to the conveyor-metered comminuted material.

It is a further object to provide such a device with vehicle-speed-responsive means for insuring uniform application of the controlled-quantities mixture, with or without manually variable application rates to field areas needing more or less added material.

Other objects and advantages will appear as the following detailed description proceeds.

Figure 1:
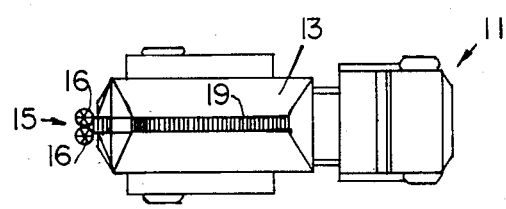
FIG. 1 is a plan view of a preferred embodiment of the invention.
Figure 2:
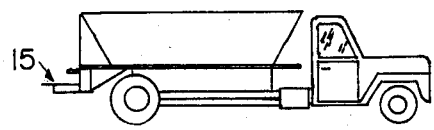
FIG. 2 is a side elevational view of the apparatus of FIG. 1.
Figure 3:
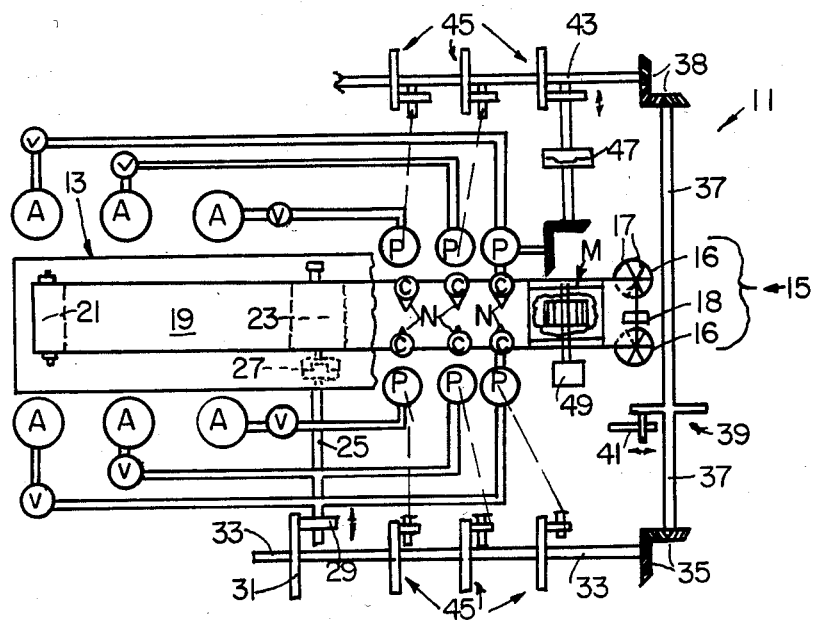
FIG. 3 is a schematic showing of the system of the present invention.

With refernce now to the drawings, the numeral 11 generally designates a spreader-truck embodiment of the invention (which could also take the form of a tractor-drawn trailer-type spreader). The truck 11 has a main large-capacity hopper 13, and a conventional spreader 15 having a laterally spaced pair of discs 16 having impeller blades 17 and a motor 18 for oppositely rotating them at a rate selected for providing a spread pattern independently of vehicle speed. Only the quantity of material per area unit is varied proportionately to vehicle speed by mechanism next described.

The comminuted base material from the hopper 13 is fed by a conventional conveyor belt 19 (or an auger, not shown). The belt 19 can be of the type shown in U.S. Pat. No. 1,880,155 (Ruth, 9-27-32), and underlies a feed opening (not shown) in the bottom of the hopper 13. The opening can be size-varied by a conventional adjustable gate (not shown). The continuous belt is stretched between rollers 21 and 23, the latter being driven by a shaft 25 through a clutch 27. The shaft 25 is driven by any known type of variable-speed mechanism, which is herein shown as consisting of a driven disc 29 keyed for axial adjustment on the shaft 25 and engaging a large disc 31 fixed to a vehicle-speed-controlled shaft 33. The shaft 33 is driven by a pair of meshed beveled gears 35 in turn driven by a shaft 37.

The shaft 37 is driven by a power-take-off generally designated 39 and hereon shown as being variable for the purpose of manually varying the amount of material deposited per unit of area, where one part of a field should receive more or less added material, as occasionally happens. The power-take-off 39 is driven by a shaft 41 non-variably connected to the power train of the vehicle (or to a wheel thereof in known manner).

The shaft 37, through bevel gears 38, drives a shaft 43, which, through variable-speed-ratio devices 45, drives each of the (gear-type) pumps P. Devices 45 each include a clutch 47, of which only one is shown for simplicity of the disclosure.

Each pump P is connected to a check valve C close to a spray nozzle N located above the belt 19 just before it moves the comminuted material into a mixer M. The mixer M can be of the general type shown in U.S. Pat. No. 1,033,297 (Barth, 7-23-12). The mixer M can be driven by an electric or hydraulic motor 49. The thoroughly mixed material is dropped from the rear (discharge) end of the mixer M onto the oppositely rotating spreader discs 16 for even distribution over the field area behind the vehicle 11.

The control means for the various material-metering and feeding means can be operated by remote-control mechanisms (not shown) having manually adjustable elements mounted on a control panel in the vehicle cab or on its dashboard. Such remote-control mechanisms can be of the servo-type or can be common bowden cables. Thus the feed ratios of any one or more of the fed materials could be varied as desired by the vehicle operator as the spreading operation is in progress.

It should also be noted that generically the auxiliary containers could hold comminuted solid concentrated chemicals which could be metered and fed by auger or other common feed means instead of by the pumps disclosed herein for metering and feeding the liquid concentrates.

The invention having been described, what is claimed is:

1. A solid-material-spreading field vehicle having a front and a rear end including a frame and a drive shaft, comprising: a solid-material-holding hopper; a solid-material-spreading mechanism; a solid-material-feeding conveyor connected between said hopper and said spreading mechanism; said spreading mechanism mounted from said vehicles at the rear thereof and having a plurality of laterally spaced material-spreading elements fed with material by and from said conveyor; a churning-type mixer overlying said conveyor immediately upstream from said spreading mechanism; a plurality of separate unrelated simultaneously usable auxiliary liquid material additive tanks all supported from said vehicle frame; said solid-material-feeding conveyor being fed with liquid from a plurality of said simultaneously usable auxiliary tanks through permanently-connected manual-valved feed lines; a control valve means and a positive-volume feed pump means in each of said feed lines; a vehicle-speed responsive mechanism operatively connected to said drive shaft of said vehicle; each of said positive feed pump means being separately driven by said vehicle-speed-responsive mechanism connected to said drive shaft of said vehicle with each of said feed pump means having a selectively independent variable drive; and said vehicle-speed-responsive mechanism including speed-ratio-changing means to effect a metering operation of said conveyor and of said pump for thereby metering solid material from said conveyer and liquid from selected ones of said tanks in correlated ratios for providing uniform material applications.

2. The invention of claim 1 wherein said valve means includes a check valve and a cut-off valve.

3. The invention of claim 1 wherein said vehicle-speed-responsive mechanism includes clutch means, disk means driven by said drive shaft, and radially adjustable wheels coupled thereto for selectively effecting said speed-ratio-changing means.

* * * * *